United States Patent [19]

Weckman et al.

[11] Patent Number: 5,443,808
[45] Date of Patent: Aug. 22, 1995

[54] METHOD OF PRODUCING ALKALI METAL PHOSPHATE

[75] Inventors: Stig-Göran A. Weckman, Espoo; Robert Perander, Helsinki; Sakari Riihmaki, Vantaa, all of Finland

[73] Assignee: Kemira Oy, Espoo, Finland

[21] Appl. No.: 356,783

[22] Filed: Dec. 12, 1994

Related U.S. Application Data

[63] Continuation of Ser. No. 776,324, filed as PCT/FI91/00100, Apr. 5, 1991, abandoned.

[30] Foreign Application Priority Data

Apr. 6, 1990 [FI] Finland ..................... 901770

[51] Int. Cl.$^6$ .................... C01B 25/30; C01B 25/445
[52] U.S. Cl. ........................ 423/309; 71/34; 423/313; 423/314
[58] Field of Search ............ 423/309, 313, 314, 321.1; 71/34

[56] References Cited

U.S. PATENT DOCUMENTS

| | | | |
|---|---|---|---|
| 3,347,627 | 10/1967 | Shen | 71/34 |
| 3,554,729 | 1/1971 | Curless | 423/309 |
| 3,607,213 | 9/1971 | Schroeder et al. | |
| 3,650,684 | 3/1972 | Watson | 71/34 |
| 3,718,453 | 2/1973 | Thompson | |
| 3,770,410 | 11/1973 | Mills et al. | |
| 3,784,367 | 1/1974 | Moore | |
| 4,134,964 | 1/1979 | Ehlers et al. | 423/321 R |
| 4,158,558 | 6/1979 | Thompson et al. | 71/34 |
| 4,885,148 | 12/1989 | Erickson et al. | |
| 5,055,124 | 10/1991 | Nguyen et al. | 423/309 |

FOREIGN PATENT DOCUMENTS

| | | |
|---|---|---|
| 482110 | 3/1977 | Australia . |
| 43740 | 6/1971 | Finland . |
| 2437748 | 2/1976 | Germany . |
| 24305 | 9/1965 | Israel . |
| 20621 | 12/1966 | Israel . |
| 22598 | 6/1968 | Israel . |
| 24004 | 1/1969 | Israel . |
| 212430 | 4/1967 | Sweden . |
| 832011 | 4/1960 | United Kingdom . |

OTHER PUBLICATIONS

Kirk-Othmer, *Encyclopedia of Chemical Technology*, Third Edition, vol. 17 (1982) No month available, John Wiley & Sons, pp. 448–453.

Von Wazer, J. R., "Phosphoric Acid and Phosphates", Kirk-Othmer *Encyclopedia of Chemical Technology* vol. 15, p. 252. (H. F. Mark, John Wiley & Sons, Inc., New York 1968). No month available.

*Primary Examiner*—Wayne Langel
*Attorney, Agent, or Firm*—Kokjer Kircher Bowman & Johnson

[57] ABSTRACT

The invention relates to a method for producing alkali metal phosphate, in particular monopotassium phosphate or its aqueous solution, by reacting fertilizer-grade phosphoric acid with alkali metal chloride at 350° ... 700° C. to produce alkali metal metaphosphate, hydrolyzing thus obtained solid reaction product, removing the insoluble residue containing impurities from the hydrolysis solution in order to achieve a pure solution of alkali metal phosphate, and if further desired, crystallizing and separating the alkali metal phosphate from said aqueous solution.

15 Claims, No Drawings

METHOD OF PRODUCING ALKALI METAL PHOSPHATE

This application is a continuation of application Ser. No. 07/776,324, filed as PCT/FI91/00100, Apr. 5, 1991, now abandoned.

The present invention relates to a method for producing alkali metal phosphate or aqueous solution of alkali metal phosphate, in which method phosphoric acid is reacted with alkali metal chloride at elevated temperature using a molar ratio of phosphorus to the alkali metal in a range of 1:1 ... 1.3:1, wherein chlorine released in the reaction is removed, the product obtained from the reaction is hydrolyzed to form an aqueous solution of alkali metal phosphate, and if desired, the alkali metal phosphate is crystallized and recovered from said aqueous solution.

Known from DE patent publication 2,437,748 is a method akin to that described above for producing monopotassium phosphate from potassium chloride and phosphoric acid. In this prior-art method the initial reactants are melted by heating at a temperature below 300° C., preferredly at 220°...250° C., simultaneously blowing air through the melt to remove chloride. Hydrolyzing the obtained reaction product with water yields monopotassium phosphate, but all the impurities contained in the phosphoric acid remain in the final product.

U.S. Pat. No. 4,885,148 discloses a method for producing monopotassium phosphate from wet process phosphoric acid having a $P_2O_5$ content of 52 ... 54% and from potassium chloride, then melting said initial reactants by heating at 180°...280° C., whereby evolving hydrogen chloride gas is removed, then dissolving the molten intermediate product in water, removing the insoluble residue, and finally crystallizing monopotassium phosphate from the solution. This method, analogously to the process known from the DE patent publication 2,437,748, also utilizes low process temperature in order to prevent formation of solid polyphosphates. A disadvantage of the low process temperature at 180°...280° C. is that removal of chloride removal remains incomplete or requires very long reaction which according to the U.S. Pat. No. 4,885,0148 is 8 hours at 265° C.

In addition to nitrogen, potassium and phosphorus are the principal nutrients required by plants. Therefore, salts of these elements are widely used as auxiliary fertilizers. Monopotassium phosphate, $KH_2PO_4$ is one of such fertilizers used in, e.g., greenhouses. In greenhouse farming it is particularly important to achieve an appropriate dosing of nutrients in order to provide the plants with nutrient quantities sufficient for optimal growth. A common approach to this problem is the use of aqueous fertilizers. In this case the fertilizer is produced as a diluted aqueous solution, which is then transferred via piping and distributed from nozzles in a controlled manner along with irrigation water. A drawback of said technique is, however, that the fertilizer must be completely soluble in water, because otherwise the insoluble constituents can cause clogging of nozzles, and thereby irrigation disturbances.

Monopotassium phosphate is a fertilizer of the above-described kind typically used in greenhouses. It is generally produced from potassium hydroxide, KOH, and pure phosphoric acid, $H_3PO_4$. Both of these initial reactants are expensive, so attempts have been made toward the use of fertilizer-grade potassium chloride, KCl, and phosphoric acid, $H_3PO_4$, as initial reactants, yet failing to achieve a commercially viable method.

In spite of its solubility in water, potassium chloride is not suitable for use is a direct source of potassium, because plants react sensitively to the chloride ion contained therein. Different methods have been developed to remove chloride from a mixture of potassium chloride and phosphoric acid, but such methods are either excessively complicated, expensive or ineffective.

Fertilizer-grade phosphoric acid also contains sulfate, which reduces the nutrient content of a fertilizer product if allowed to pass down to final product.

It is an object of the present invention to achieve such a method for producing alkali metal phosphate, in particular monopotassium phosphate and monosodium phosphate, that is capable of overcoming the drawbacks of prior-art methods, uses cost-advantageous initial reactants and yields a completely water-soluble alkali metal phosphate, which is suitable for producing aqueous fertilizers in particular.

A further object of the present invention is to achieve a method for producing alkali metal phosphate with a low sulfate content.

These goals are achieved by way of the present invention, whose principal characteristics will be evident from the enclosed claims.

According to the invention, the primary goal has been achieved by a method suitable for producing alkali metal phosphate or aqueous solution of alkali metal phosphate, in which method fertilizer-grade phosphoric acid is reacted with alkali metal chloride at approx. 350°...700° C. using a molar ratio of phosphorus to the alkali metal in a range of 1:1 ... 1.3:1, wherein chlorine released in the reaction is removed, the obtained solid reaction product principally containing alkali metal metaphosphate is hydrolyzed at 60°...100° C., and the insoluble residue containing impurities is removed from the hydrolyzing solution in order to form a pure aqueous solution of alkali metal phosphate, which, if desired, is further crystallized and the alkali metal phosphate is recovered from said aqueous solution.

According to the invention it is thus possible to process fertilizer-grade phosphoric acid and potassium chloride into potassium metaphosphate, also called potassium polyphosphate. The solubility of this product in water is low, but it can be hydrolyzed to monopotassium phosphate by hot-water treatment. Only the impurities remain in insoluble form. From the aqueous solution the product can then be crystallized by concentrating and/or cooling of the solution.

A suitable initial reactant is, e.g., wet-process phosphoric acid having a $P_2O_5$ content of approx. 20 ... 60%, preferredly approx. 25 ... 55%. Typical content can be 30% $P_2O_5$ or 50% $P_2O_5$. Sulfate content in phosphoric acid typically varies in the range 2 ... 4% $SO_4$.

Typical content of the second initial reactant, that is, potassium chloride is 58 ... 60% $K_2O$ in a fertilizer-grade raw material.

The quality and quantity of the produced monopotassium phosphate or monosodium phosphate can be controlled by adjusting the process temperature, melt retention, and the molar ratios P/K or P/Na.

Process temperature is held at approx. 350°...700° C., preferredly 400°...650° C. Melt retention is typically in the range 15 ... 120 min. The molar ratio P/K or P/Na is in the range 1:1 ... 1.3:, preferredly 1.1:1 ... 1.3:1.

Processing at elevated temperature results in short retention of metaphosphate production and removal of chlorine, while the reaction becomes slower and results in less complete removal of chlorine at lower temperatures which give the highest yield.

The molar ratio P/K, or correspondingly, the molar ratio P/Na, is adjusted so as to provide the soluble product with a nearly stoichiometric ratio, that is, P/K=1 and P/Na=1, respectively. To attain this, the molar ratios in the initial reactants must be P/K>1 or P/Na>1, respectively, because the ratio in the residue is P/K>1 or P/Na>1, respectively.

Removal of chlorine during heat treatment of materials in an oven is linearly proportional to the process temperature and the molar ratio P/K or P/Na, and at lower temperatures, also to the retention in the oven. At elevated temperatures used according to the invention, removal of chlorine is effective even at a short retention. It is also possible to remove chlorine from weakly soluble alkali metal metaphosphate by dissolving prior to hydrolysis. Alternatively, chlorine can be removed during crystallization of the final product. Chloride content in alkali metal phosphate produced by the method according to the invention is very low.

Besides water and hydrogen chloride, gases removed from the reactor also contain fluorine, silicon and sulfur (HF, $SiF_4$, $SO_3$). The solid product from the reactor containing alkali metal metaphosphate is ground to desired particle size in order to speed its hydrolysis.

Hydrolysis is advantageously carried out using approx. 0.25-... 4-fold amount of water in respect to the alkali metal metaphosphate. Temperature in hydrolysis is approx. 60°... 100° C., typically approx. 80°... 100° C. Elevated temperatures promote hydrolysis. Duration of the hydrolysis stage is typically 10 ... 120 min.

The product from the hydrolysis stage is filtered, whereby the filtrate is a solution containing alkali metal phosphate that can be used as a fertilizer as such, or alternatively, the alkali metal phosphate can be crystallized from the solution by concentration and/or cooling of the solution. The product according to the invention that advantageously is monopotassium phosphate, $KH_2PO_4$, is thus completely water-soluble, because the product was dissolved in water during the hydrolysis of potassium metaphosphate.

The solids reject from the filtration stage contains, i.a., K, P, Mg, Fe, Al, Mn, Na, Ca, Si and other heavy metals. The principal nutrient elements (K, P, Mg) from this reject can be utilized in, e.g., manufacturing of fertilizers.

The mother liquor of the alkali metal phosphate can be recycled to the heating or hydrolysis stages.

The amount of sulfate in the final product stemming from the fertilizer-grade phosphoric acid raw material can be reduced in several alternative manners. Firstly, sulfate can be removed already directly from the phosphoric acid as gypsum by precipitation with a potassium salt. The evolved gypsum can also be left over in the phosphoric acid, from where it can be removed by filtration in conjunction with the hydrolysis residues. Besides as gypsum, sulfate in this case also occurs as syngenite $K_2SO_4.CaSO_4.H_2O$. When the molar ratio P/K or P/Na is above 1 and the solution is acid, sulfate can also be removed by precipitation as a double salt $K_2SO_4.H_3PO$. Suitable potassium salts for precipitation are such salts whose other ions remain with the residue, are removed along with the evolving gases or can be included in the fine. 1 aqueous product. Typical of these are, for instance, $Ca(OH)_2$, $CaCl_2$, Ca-containing phosphates such as hydroxyapatite, $CaCO_3$ and CaO.

At elevated temperatures, sulfate is bound with the residue and removed along with the gases evolving in the reactor. Alternatively, sulfate can be removed prior to the hydrolysis by dissolution from the alkali metal metaphosphate whose solubility is low.

When an excess of phosphoric acid is used, the final aqueous product can be brought to correct pH (1% solution, pH 4.5) either with potassium hydroxide, or at the presence of sulfate, also with calcium hydroxide, whereby syngenite $CaSO_4.K_2SO_4.H_2O$ is precipitated. From a mildly acidic solution the removal of HCl can be performed by sparging with a gas (e.g., air) or by use of vacuum.

The salts $K_2SO_4.H_3PO_4$ and $CaSO_4.K_2SO_4.H_2O$ crystallize free from chlorine, and they can be used in, e.g., fertilizers. Through precipitation of gypsum, these salts can be converted, if desired, to dipotassium phosphate and potassium sulfate according to the following reactions:

$K_2SO_4.H_3PO_4 + Ca(OH)_2 \rightarrow K_2HPO_4 + CaSO_4.2H_2O$
$CaSO_4.K_2SO_4.H_2O + H_2O \rightarrow K_2SO_4 + CaSO_4.2H_2O$ In the following the invention is described in greater detail by way of exemplifying embodiments. All percentages (%) given are % w/w.

The following raw materials are used as initial reactants of the examples:

Wet-process phosphoric acid analyzed as: 48.3% $P_2O_5$, 4.1% $SO_4$, 0.92% Mg, 0.49% Fe, 0.29% F, 0.01% Al 0.01% Ca, 0.02% K, 0.05% Mn, 0.2% $SiO_2$, 0.002% Na.

Desulphated phosphoric acid analyzed as: 50% $P_2O_5$, 0.13% $SO_4$, 0.20% Ca. This initial reactant was produced from the above-described phosphoric acid by removing sulfate from it by precipitation as gypsum. The precipitating reagent used was calcium hydroxide. Precipitation was carried out using Ca/S molar ratio 1.1, temperature 80° C., and retention time 1 h.

Fertilizer-grade potassium chloride analyzed as: 59.8% $K_2O$, 47.3% Cl, 1.2% Na, 0.30% $SO_4$, 0.09 % Mg, 0.01% Al, 0.008% Fe.

Sodium chloride analyzed as: 39.2% Na, 60.5% Cl, 0.01% K.

EXAMPLE 1

33.80 g phosphoric acid (48.3% $P_2O_5$) and 15.70 g KCl (P/K 1.15) were mixed and heated for 20 min at 600° C. After removal of evolved gases, the yield was 28.59 g potassium metaphosphate $(KPO_3)_n$, which was ground and dissolved in 100 g water for 120 min at 80°. .. 100° C.; 11.59 g insoluble residue was removed, and crystallization of the solution yielded 18.11 g of $KH_2PO_4$.

The product was analyzed as:
45.7% $P_2O_5$
31.9% $K_2O$
7.1% $SO_4$
0.25% Cl

EXAMPLE 2

32.52 g phosphoric acid (48.3% $P_2O_5$) and 13.42 g KCl (P/K 1.3) were mixed and heated for 15 min at 500° C. The reaction yield was 27.05 g potassium metaphosphate $(KPO_3)_n$, which was crushed and dissolved in 25 g water for 15 min at 60°. ... 100° C.; 10.16 g insoluble residue was removed, and crystallization of the solution yielded 21.3 g of the final product analyzed as 45.5% $P_2O_5$
23.8% $K_2O$
0.4% Cl

EXAMPLE 3

35.49 g desulfated phosphoric acid (50% $P_2O_5$) and 15.70 g KCl (P/K 1.25) were mixed and heated for 15 min at 700° C.

The reaction yield was 28.79 g potassium metaphosphate $(KPO_3)_n$, which was ground and dissolved in 100 g water for 120 min at 80°...100° C. 12.19 g insoluble residue was removed, and crystallization of the solution yielded 18.51 g of $KH_2PO_4$ as the final product, whereby the analysis results were as follows:

52.1% $P_2O_5$
29.8% $K_2O$
0.40% $SO_4$
0.48% Cl

EXAMPLE 4

33.80 g phosphoric acid (48.3% $P_2O_5$) and 12.31 g sodium chloride (P/Na 1.15) were mixed and heated for 60 min at 500° C. The reaction yield was 25.26 g sodium metaphosphate $(NaPO_3)_n$, which was crushed and dissolved in 100 g water for 10 min at 80°...100° C. 5.37 g insoluble residue was removed, and crystallization of the solution yielded 24.41 g of the final product, whereby the analysis results were as follows:

| Product | Residue |
| --- | --- |
| 48.8% $P_2O_5$ | 68.2% $P_2O_5$ |
| 21.0% $Na_2O$ | 3.5% $Na_2O$ |
| 5.2% $SO_4$ | 6.2% MgO |
| 0.44% Cl | 2.9% $Fe_2O_3$ |
|  | 2.1% $SiO_2$ |
|  | 0.6% MnO |
|  | 0.3% $K_2O$ |

EXAMPLE 5

31.22 g phosphoric acid (48.3% $P_2O_5$) and 13.42 g potassium chloride (P/K 1.25) were mixed and heated for 15 min at 50° C. The reaction yield was 26.37 g potassium metaphosphate $(KPO_3)_n$, which was crushed and dissolved in 25 g water for 15 min at 80°...100° C. 11.39 g insoluble residue was removed, and crystallization of the solution yielded 4.88 g of the final product, whose formula according to analysis was $K_2SO_4 \cdot H_3PO_4$. When an aliquot of 22.36 g $K_2SO_4 \cdot H_3PO_4$ produced in the above-described manner was mixed with 6.1 g $Ca(OH)_2$ and 77.64 g $H_2O$ and the mixture was heated, the result was 22.32 g gypsum, $CaSO_4 \cdot 2H_2O$ and 6.74 g of a mixture of monopotassium phosphate, $KH_2PO_4$, and dipotassium phosphate, $K_2HPO_4$.

EXAMPLE 6

33.80 g phosphoric acid (48.3% $P_2O_5$) was diluted in 47.83 g water to obtain 20% concentration of $P_2O_5$ and 1.45 g hydroxyapatite, $Ca_{10}(OH)_2(PO_4)_6$ was added to it; thereafter the solution was heated under agitation for 1 h at 80° C. Next, the acid and 16.29 g KCl (P/K 1.15) were mixed and heated for 120 min at 350° C. The reaction yield was 31.17 g potassium metaphosphate, which was ground and dissolved in 100 g water for 60 min at 80°...100° C. 5.97 g insoluble residue was removed from the solution (solution 1) and re-dissolved as above, whereby weight of the insoluble residue was reduced to 4.82 g and a second aqueous solution was obtained (solution 2). Solutions 1 and 2 were combined, and their crystallization yielded 12.70 g of the final product, whereby the analysis results were as follows:

42.3% $P_2O_5$
31.5% $K_2O$
6.8% $SO_4$
0.28% Cl

Evaporation to dryness of the mother liquor of crystallization yielded 17.94 g of the final product, whereby the analysis results were as follows:

41.1% $P_2O_5$
24.5% $K_2O$
2.4% $SO_4$
5.3% Cl

EXAMPLE 7

28.62 g phosphoric acid (48.3 % $P_2O_5$) and 13.42 g potassium chloride (P/K 1.14) were mixed with 2.0 g calcium chloride, $CaCl_2 \cdot 2H_2O$, and heated for 60 min at 500° C. The reaction yielded 25.52 g potassium metaphosphate $(KPO_3)_n$, which was crushed and diluted in 100 g water for 15 min at 80°...100° C. 6.12 g insoluble residue was removed, and crystallization of the solution yielded four fractions, of which the first fraction principally contained syngenite, $CaSO_4 \cdot K_2SO_4 \cdot H_2O$. The weights and sulfate contents of the final product fractions are given below in the order of crystallization:

1. 2.20 g 17.4% $SO_4$
2. 3.87 g 1.7% $SO_4$
3. 11.02 g 2.1% $SO_4$
4. 6.47 g 2.3% $SO_4$

EXAMPLE 8

33.80 g phosphoric acid (48.3% $P_2O_5$) was mixed with 1.07 g $Ca(OH)_2$ and heated for 1 h at 80° C. The phosphoric acid and produced gypsum were mixed with 16.47 g potassium chloride (P/K 1.1) and heated for 60 min at 500° C. The reaction yield was 30.2 g potassium metaphosphate $(KPO_3)_n$, which was ground and dissolved in 100 g water for 60 min at 80°...100° C. 16.35 g insoluble residue was removed from the solution, which yielded by crystallization 10.04 g of final product 1, and by evaporation to dryness of mother liquor, 4.36 g of final product 2. Re-dissolving 16.35 g of the residue in the manner described in the example above reduced weight of the insoluble residue to 8.11 g. Finally, product 3 (9.70 g) was made from the solution by crystallization. The products were analyzed as follows:

|  | % $P_2O_5$ | % $K_2O$ | % $SO_4$ | % Cl | % F | pH (1%) |
| --- | --- | --- | --- | --- | --- | --- |
| Prod. 1 | 38.6 | 36.3 | 5.4 | 2.9 | 0.02 | 3.7 |
| Prod. 2 | 37.1 | 38.0 | 3.6 | 10.2 | 0.03 | 3.4 |
| Prod. 1 | 51.7 | 29.0 | 0.2 | 0.02 | <0.01 | 4.3 |

EXAMPLE 9

33.80 g phosphoric acid (48.3% $P_2O_5$) was mixed with 1.07 g $Ca(OH)_2$ and heated for 1 h at 80° C. The phosphoric acid and produced gypsum were mixed with 15.70 g potassium chloride (P/K 1.15) and heated for 60 min at 500° C. The reaction yield was 29.05 g potassium metaphosphate $(KPO_3)_n$, which was ground and dissolved in 100 g water for 60 min at 80°... 100° C. 12.77 g insoluble residue was removed from the solution, which yielded by crystallization 8.04 g of final product 1, and by evaporation to dryness of mother liquor, 10.00 g of final product 2. Re-dissolving 12.77 g of the residue in the manner described in the example above reduced weight of the insoluble residue to 7.42 g, and 6.15 g of final product 3 was made from the solution by crystallization. The products were analyzed as follows:

|         | % $P_2O_5$ | % $K_2O$ | % $SO_4$ | % Cl | % F    | pH (1%) |
|---------|------------|----------|----------|------|--------|---------|
| Prod. 1 | 42.2       | 34.0     | 12.1     | 0.2  | <0.01  | 3.7     |
| Prod. 2 | 44.2       | 34.2     | 6.8      | 3.5  | 0.02   | 3.7     |
| Prod. 1 | 54.3       | 30.4     | 0.2      | 0.04 | <0.01  | 4.3     |

EXAMPLE 10

33.80 g phosphoric acid (48.3% $P_2O_5$) was mixed with 1.07 g Ca(OH)$_2$ and heated for 1 h at 80° C. The phosphoric acid and produced gypsum were mixed with 15.10 g potassium chloride (P/K 1.20) and heated for 60 min at 500° C. The reaction yield was 28.47 g potassium metaphosphate (KPO$_3$)$_n$, which was ground and dissolved in 100 g water for 60 min at 80°... 100° C. 14.54 g insoluble residue was removed from the solution, which yielded by crystallization 5.70 g of final product 1, and by evaporation to dryness of mother liquor, 7.90 g of final product 2, Re-dissolving 16.40 g of the residue in the manner described in the example above reduced weight of the insoluble residue to 8.01 g, and 8.91 g of final product 3 was made from the solution by crystallization. The products were analyzed as follows:

|         | % $P_2O_5$ | % $K_2O$ | % $SO_4$ | % Cl | % F    | pH (1%) |
|---------|------------|----------|----------|------|--------|---------|
| Prod. 1 | 36.1       | 37.1     | 16.1     | 0.66 | <0.01  | 3.6     |
| Prod. 2 | 44.7       | 32.3     | 3.8      | 3.1  | 0.01   | 3.2     |
| Prod. 1 | 52.3       | 29.3     | 0.1      | 0.02 | <0.01  | 4.0     |

EXAMPLE 11

33.80 g phosphoric acid (48.3% $P_2O_5$) was mixed with 1.07 g Ca(OH)$_2$ and heated for 1 h at 80° C. The phosphoric acid and produced gypsum were mixed with 15.70 g potassium chloride (P/K 1.15) and heated for 60 min at 450° C. The reaction yield was 29.59 g potassium metaphosphate (KPO$_3$)$_n$, which was ground and dissolved in 100 g water for 60 min at 80°... 100° C. 16.40 g insoluble residue was removed in the manner described above from the solution (solution 1), and the residue was re-dissolved, whereby solution 2 was obtained, as well as 8.58 g of residue, which was further subjected to dissolution in neutral (pH 7) ammonium citrate (65° C., 1 h). The result was 1.89 g of reject, whose analysis is given below. Solutions 1 and 2 were combined yielding 21.9 g of final product, whose analysis is given below:

EXAMPLE 12

31.22 g phosphoric acid (48.3 % $P_2O_5$) was mixed with 13.42 g potassium chloride (P/K 1.25) and heated for 15 min at 500° C. The reaction yield was 26.72 g potassium metaphosphate (KPO$_3$)$_n$, which was ground and dissolved in 25 g of residue washings and 25.4 g of mother liquor from the crystallization step for 15 min at 80°... 100° C. 11.46 g insoluble residue (reject 1) was removed from the solution and washed in 25 g water, which was then transferred to the next dissolution step. Crystallization of the solution yielded 20.97 g of final product, after which 22.94 g of the barren mother liquor was transferred to the next dissolution step. Residue 1 was ground and dissolved in 115 g H$_2$O for 1 h at 80°... 100° C., whereby 2.43 g of insoluble residue (reject 2) remained. The final product and residues were analyzed as follows:

|          | % $P_2O_5$ | % $K_2O$ | % $SO_4$ | % Cl | % MgO | % $Fe_2O_3$ | % $Al_2O_3$ | % MnO |
|----------|------------|----------|----------|------|-------|-------------|-------------|-------|
| Product  | 49.8       | 27.3     | 6.0      | 1.3  |       |             |             |       |
| Reject 1 | 68.8       | 23.0     | 1.8      |      | 5.2   | 1.9         | 0.4         | 0.2   |
| Reject 1 | 71.0       | 14.2     | 0.8      |      | 9.7   | 4.3         | 0.7         | 0.3   |

EXAMPLE 13

34.07 g desulfated phosphoric acid (50% $P_2O_5$) was mixed with 15.70 g potassium chloride (P/K 1.30) and heated for 20 min at 550° C. The reaction yield was 28.36 g potassium metaphosphate (KPO$_3$)$_n$, which was ground and dissolved in 30 g water for 60 min at 80°... 100° C. Crystallization of the resulting solution was yielded 5.10 g of final product (product I), and the residue was dissolved in 100 g water for 120 min at 20°... 25° C. 16.15 g insoluble residue was removed from the solution and crystallization of the solution yielded 9.40 g of final product (product II). The final products were analyzed as follows:

|            | % $P_2O_5$ | % $K_2O$ | % $SO_4$ | % Cl  |
|------------|------------|----------|----------|-------|
| Product I  | 40.9       | 25.6     | 1.1      | 6.3   |
| Product II | 44.0       | 26.6     | 0.08     | 0.26  |

We claim:

1. A method for producing an aqueous solution of an alkali metal phosphate or a water soluble alkali metal phosphate comprising the steps of:
  reacting a phosphoric acid component with an alkali metal chloride in a molar ratio of phosphorus to alkali metal in the range of 1:1 to 1.3:1 and at a temperature ranging from 350° C. to 700° C., the reaction time ranging from 15 to 120 minutes, to produce an alkali metal metaphosphate and hydrogen chloride, said phosphoric acid component comprising fertilizer-grade phosphoric acid;
  removing said hydrogen chloride liberated during said reacting step to produce a solid reaction product comprising said alkali metal metaphosphate;

|          | % $P_2O_5$ | % $K_2O$ | % $SO_4$ | % Cl | % MgO | % $Fe_2O_3$ | % MnO | % CaO | % $SiO_2$ | % F  | pH (1%) |
|----------|------------|----------|----------|------|-------|-------------|-------|-------|-----------|------|---------|
| Product  | 44.5       | 31.6     | 5.8      | 1.9  |       | 0.03        |       |       |           | 0.01 | 3.6     |
| Reject*  | 65.5       | 18.4     |          |      | 4.2   | 8.2         | 0.3   | 2.4   | 0.7       |      |         |

(*from ammonium citrate dissolution)

selectively hydrolyzing said solid reaction product at a temperature ranging from 60° C. to 100° C. to produce an aqueous hydrolyzing solution of said alkali metal phosphate and an insoluble residue containing impurities; and separating said insoluble residue from said hydrolyzing solution to produce a pure aqueous solution of said alkali metal phosphate; and optionally crystallizing and recovering said alkali metal phosphate from said pure aqueous solution.

2. A method according to claim 1, wherein said method comprises reacting a fertilizer-grade phosphoric acid with an alkali metal chloride, the $P_2O_5$ content of said fertilizer-grade phosphoric acid ranging from 20 to 60% by weight of the total acid.

3. A method according to claim 1, wherein said method comprises reacting a fertilizer-grade phosphoric acid with an alkali metal chloride, said alkali metal chloride selected from the group consisting of fertilizer-grade potassium chloride.

4. A method according to claim 1, wherein said method comprises reacting a phosphoric acid component with an alkali metal chloride, the molar ratio of phosphorus to said alkali metal ranges from 1.1:1 to 1.25:1.

5. A method according to claim 1, wherein said method comprises reacting a phosphoric acid component with an alkali metal chloride, said phosphoric acid being reacted with said alkali metal chloride at a temperature ranging from 400° to 650° C.

6. A method according to claim 1, wherein said method additionally comprises the step of adding calcium salt to fertilizer-grade phosphoric acid prior to said reacting step such that sulfate present in said phosphoric acid component is combined with said calcium to produce calcium sulfate and derivatives thereof.

7. A method according to claim 6, wherein said method additionally comprises removing said calcium sulfate from said phosphoric acid component prior to said reaction step.

8. A method according to claim 6, wherein a double salt $K_2SO_4 \cdot H_3PO_4$ of potassium sulfate and phosphoric acid is removed by crystallization from said hydrolyzing solution to provide a double salt, the double salt being treated with a calcium salt and water to provide calcium sulfate in an aqueous solution containing potassium phosphates, and the calcium sulfate being removed.

9. A method according to claim 6, wherein the calcium salt is selected from the group consisting of calcium hydroxide, calcium chloride, calcium phosphate, calcium carbonate and calcium oxide.

10. A method according to claim 2, wherein said method comprises reacting a fertilizer-grade phosphoric acid with an alkali metal chloride, the $P_2O_5$ content of said fertilizer-grade phosphoric acid ranging from 25 to 55% by weight of the total acid.

11. A method according to claim 6, wherein said reacting step additionally results in a double salt of calcium sulfate being produced and said double salt of calcium sulfate is removed after the hydrolysis step in conjunction with said insoluble residue containing impurities.

12. A method according to claim 6, wherein said reacting step additionally results in a double salt of calcium sulfate being produced and said double salt of calcium sulfate is removed by crystallization from said hydrolysis solution.

13. A method according to claim 1, wherein said reacting step additionally comprises reacting with said phosphoric acid component and said alkali metal chloride, a calcium salt to produce said alkali metal metaphosphate, said hydrogen chloride and a double salt of calcium sulfate, the double salt of calcium sulfate being removed after the hydrolysis step in conjunction with said insoluble residue containing impurities.

14. A method according to claim 1, wherein said reacting step additionally comprises reacting with said phosphoric acid component and said alkali metal chloride, a calcium salt to produce said alkali metal metaphosphate, said hydrogen chloride and a double salt of calcium sulfate, the double salt of calcium sulfate being removed by crystallization from said hydrolysis solution.

15. A method according to claim 1, wherein said method additionally comprises the step of dissolution of said solid reaction product such that the sulfate and chloride present in said reaction product are dissolved to provide a solid reaction product of reduced sulfate and chloride content prior to said hydrolysis step whereby metallic impurities are removed as an insoluble residue to yield a pure alkali metal phosphate.

* * * * *